United States Patent [19]

Re et al.

[11] Patent Number: 4,833,227

[45] Date of Patent: May 23, 1989

[54] EPOXY RESINS PREPARED FROM PERFLUOROALKYLENE TELOMERS

[75] Inventors: ALberto Re; Mario Alfieri, both of Milan, Italy

[73] Assignee: Ausimont S.p.A., Milan, Italy

[21] Appl. No.: 131,108

[22] Filed: Dec. 10, 1987

[30] Foreign Application Priority Data

Dec. 15, 1986 [IT] Italy ............................. 22678 A/86

[51] Int. Cl.$^4$ ...................... C08G 59/06; C08G 59/02; C08G 59/30
[52] U.S. Cl. ...................................... 528/73; 528/104; 528/108; 528/110; 528/103; 528/401; 528/402
[58] Field of Search ............... 528/110, 103, 401, 402

[56] References Cited

U.S. PATENT DOCUMENTS 4,267,302  5/1981  Ohmori ............................. 528/103
4,699,969  10/1987  Re et al. ........................... 528/402

Primary Examiner—John Kight
Assistant Examiner—Frederick Krass
Attorney, Agent, or Firm—Stevens, Davis, Miller & Mosher

[57] ABSTRACT

Fluorinated polymers having epoxy resin structure, containing at least 10% by weight, preferably 20% by weight, of fluorine, prepared starting from epichlorohydrin and from one or more diols, at least one of which is a perfluoroalkylene diol, and by using conventional cross-linking agents for epoxy resins, such as anhydrides of dicarboxylic acids, di- or tri-isocyanates, polyfunctional amines.

2 Claims, No Drawings

EPOXY RESINS PREPARED FROM PERFLUOROALKYLENE TELOMERS

FIELD OF THE INVENTION

The invention relates to fluorinated polymers having epoxy resin structure, prepared starting from epichlorohydrin and from one or more diols, at least one of which is a perfluoroalkylene diol.

SUMMARY OF THE INVENTION

The polymers of the invention are prepared starting from prepolymers having the following general formula:

$$B-(OAO-CH_2-CH(OB)-CH_2)_x- \qquad (I)$$

$$-(OR_fO-CH_2-CH(OB')-CH_2)_y-ODO-B'$$

wherein:
x is an integer from 0 to 20,
y is an integer from 1 to 20,
x+y are preferably $\geq 2$,
B, B', equal or different from each other, being H or

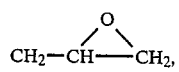

A is a radical of a fluorinated or non-fluorinated diol containing one or more aromatic or cycloaliphatic or polycyclic rings, for example those derived from the following diols:

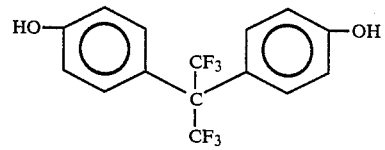

(hexafluoro-isopropylidene-p,p'-diphenol, referred to as bisphenol AF),

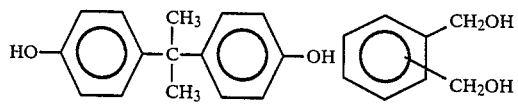

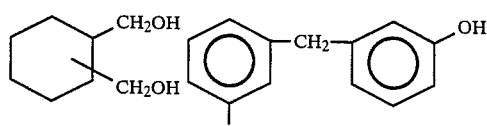

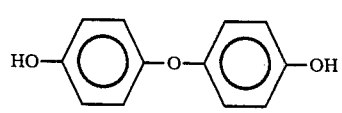

$R_f$ is a straight or branched perfluoroalkylene radical of formula:

$$-(CH_2)_q-(CF_2CF_2)_n-(CH_2)_q-$$

wherein
n is an integer from 2 to 8 and
q is 1 or 2, or of formula:

$$-(CH_2)_q(CF_2CF_2)_p(CF_2CF(X))_m-(CH_2)_q-$$

wherein
p and m are integers from 1 to 8,
q is 1 or 2,
X is a perfluoroalkyl having from 1 to 3 carbon atoms or a halogen other than fluorine; and
D is A or $R_f$.

The units constituting the polymeric structure of formula I, respectively indicated by indexes x and y, have a random or block distribution inside the polymeric chain.

The prepolymers of formula I can be further polycondensed and are cross-linkable by means of the cross-linking agents usually utilized for the epoxy resins, selected from the polyfunctional compounds, in particular from the di- and tri-functional compounds, capable of reacting with the hydroxyls and/or with the epoxy groups contained in the prepolymer.

Suitable cross-linking agents are di- and tri-isocyanates, anhydrides of dicarboxylic acids, polyfunctional amines, polyphenols, polythiols, etc.

Therefore, the cross-linking treatment can be also of the mixed type: polyisocyanate+amine or anhydride, provided the reaction conditions are adjusted so as to allow both the reaction with the epoxy groups and the reaction with the OH groups.

Furthermore, by varying the number of units A and $R_f$ consituting the polymer, their relative ratio and their chemical nature, a wide range of polymers and resins for a plurality of uses is obtained.

BACKGROUND OF THE INVENTION

There are known cross-linked fluorinated resins of the epoxy type prepared starting from epichlorohydrin, a fluorinated bisphenol and a fluorinated diol of formula:

$$HO(CF_3)_2CCH_2CH=CHC(CF_3)_2OH,$$

(U.S. Pat. No. 4,132,681. However, such cross-linked resins exhibit rather low thermal, chemical and photochemical stabilities and are difficult to prepare.

Known too and described in U.S. Pat. No. 3,810,874 are fluorinated polyoxides cross-linkable with amines; however, said polymers, after cross-linking has occurred, do not possess satisfactory mechanical characteristics, such as hardness, tensile strength, modulus of elasticity, elongation.

Therefore, the polymers of the prior art are not suitable for particular uses, such as e.g. printed circuits, in which the coating polymer has to guarantee, along with exceptional characteristics of stability to heat and to solvents, also a high chemical stability, as well as high mechanical properties, even at very high temperatures.

Thus, there was the requirement to produce highly cross-linked epoxy-type resins exhibiting improved mechanical properties and offering, in particular, applicative advantages as compared with already known analogous products.

THE PRESENT INVENTION

The polymers obtainable according to the present invention exhibit a complex of very interesting properties and characteristics, as better defined hereinafter, provided the fluorine content is at least 10% by weight and preferably at least 20% by weight.

In particular, they possess improved characteristics of chemical, thermal and oxidizing stability, resistance to hydrolysis, to solvents and to atmospheric agents, low surface energy, no degradation when exposed to ultra-violet rays, low wettability by water and organic solvents, a low refractive index, high Tg, a high thermal coefficient and a low dielectric constant.

Furthermore, it has been ascertained that the rigid perfluorinated blocks in the macromolecular chain act as barriers to the diffusion of micromolecular products and therefore improve the swelling characteristics to solvents.

A further advantage of the polymers obtainable according to the present invention resides in that the characteristic perfluoroalkylene blocks impart to the polymer compatibility with polymers obtained from fluoroolefins, chlorofluoroolefins, hydrofluoroolefins, such as for example polytetrafluoroethylene.

Still another advantage of the polymers obtainable according to the present invention consists in that it is possible to produce very thin and dimensionally stable films and furthermore, by properly choosing the comonomer diol, it is possible to achieve a high adhesion to substrates of any type. Thus, it is possible to prepare a coating film endowed with the high chemical stability of PTFE and, at the same time, with a high adhesion to the substrate, the latter property being completely missing in PTFE.

The adhesion of these films in particular applications can be improved by using a primer, for example an epoxy primer.

The blocks of perfluoroalkylene units according to the present invention exhibit a resistance to solvents and an imperviousness to gases which are higher than those exhibited by the perfluoropolyethereal blocks, such as those described in European patent application No. 212,319. Furthermore, the epoxy resins described in the abovesaid patent application exhibit a very low Tg, are particularly suitable for low-temperature applications. The polymeric products obtainable according to the present invention exhibit a quite high Tg and an excellent mechanical resistance even at rather high temperatures.

The blocks of perfluoroalkylene units according to the invention can be combined, moreover, with perfluoropolyethereal blocks to provide highly fluorinated condensation polymers, which are highly fluorinated and possess excellent properties surface and dielectric- oil- and water-repellency, chemical resistance and the like properties.

Compared with the polycondensation hydrogenated polymers of the art, the polymers of the present invention exhibit a higher stability to heat and to thermooxidation, and improved resistance to solvents and good mechanical properties at high temperatures, though retaining a not lower processability in the various forming processes. In addition, they possess improved surface properties and exhibit a good resistance to wear.

A further object of the present invention are the cross-linked fluorinated resins obtained by treating a prepolymer of general formula I with cross-linking agents which act on the hydroxy and/or epoxy groups of the starting prepolymer.

The resins according to the invention are endowed with exceptional mechanical properties and high stabilities to sunlight, to heat and to the chemical and atmospherical agents and are utilized as adhesive, structural materials, paints, coatings.

The prepolymers of general formula I can be synthetized according to the following scheme:

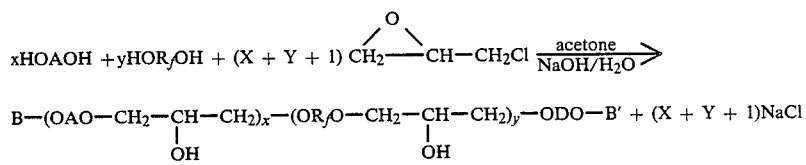

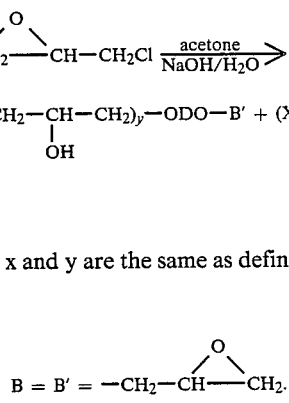

where A, $R_f$, x and y are the same as defined above; and

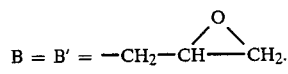

A typical example is the following: a solution-in-acetone of diol HOAOH and of diol $HOR_fOH$ with epichlorohydrin and aqueous sodium hydroxide in excess of at least 10–20% by weight with respect to chlorine (which liberated during condensation) is heated under reflux. On conclusion of the reaction, the precipitated NaCl is filtered off, whereafter a solution of HCl 1N is added until neutrality is obtained. The solvent is evaporated at 50° C. under vacuum and the prepolymer is dissolved in $CH_2Cl_2$ separating the aqueous phase. It is anhydrified with anhydrous $Na_2SO_4$ and, after filtration, the solvent is evaporated at 50° C. under vacuum.

The product so obtained is a fluorinated prepolymer having values of x and y depending on the starting ratio of fluorinated diols HOAOH and $HOR_fOH$ and on the amount of epichlorohydrin utilized. In particular, if the epichlorohydrin excess is ≧20% referred to the stoichiometric amount, the sum of indexes x and y is ≦5 and a prepolymer having prevailingly the functionality of an epoxide is obtained.

Conversely, if the utilized epichlorohydrin amount varies from 1:1 molar ratio of 20% excess with respect to the total amount of diols, the sum of indexes x and y is ≧5, and the prepolymer has prevailingly the characteristics of a polyol.

However, since the change from the nature of epoxide to that of polyol occurs gradually and both characteristics can coexist inside the polymeric chain, it is possible to subject such products to a mixed treatment with isocyanate and amine or anhydride, of course selecting, in this case, the best reaction conditions.

If both structural characteristics of epoxide and of polyol coexist and if only the epoxy end groups of the prepolymer are treated, resins containing functional OH groups utilizable for further subsequent reactions are obtained.

Furthermore, the viscosity of the obtained prepolymer depends on the starting ratio of diols HOAOH and HOR$_f$OH to each other, and on the ratio of both to the total amount of epichlorohydrin.

It is possible to obtain prepolymers having viscosities varying over an extremely broad range of values, in relation to the difficult fields of application and to the characteristics of the final resin to be obtained from said prepolymers.

An alternative method to that described hereinabove for preparing the fluorinated polymers of the invention utilizes, as a starting product, the bisepoxide of formula:

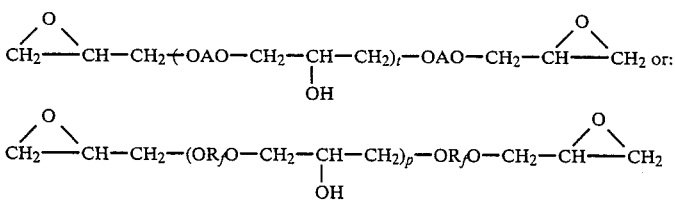

where A and R$_f$ have the meaning defined above and t and p are integers greater than or equal to zero.

The abovesaid bisepoxides are prepared by reacting epichlorohydrin with diol HOAOH or diol HOR$_f$OH respectively, in the presence of NaOH in order to neutralize HCl which is formed.

By heating the bisepoxide containing radicals A or R$_f$ respectively with the diol of R$_f$ or of A and with a catalyst based on a tertiary amine (such as diazadicyclooctane and dimethylbenzylamine) at 100°–165° C. for 6–20 hours in a thermoregulated reactor, fluorinated block polymers are obtained, the x and y values thereof being depending on the molar ratio of the reagents containing groups A and R$_f$. In particular, high molecular weight polymers are obtained when the epoxide/diol molar ratio is close to 1, while low molecular weight polymers are obtained when said molar ratio is close to 0.5 or to 2. The end groups will be of the epoxy or hydroxy type depending on whether an excess of bisepoxide or of diols is utilized.

The fluorinated block polymers so obtainable behave in like manner as the random polymers prepared according to the previously described method.

For both types of polymers, i.e. block polymers and random polymers, the values of x and y can be determined by titration of the epoxy end groups or of the hydroxy groups and by NMR and IR analyses.

The cross-linkable epoxy resins of the present invention may be—depending on the fields of use—liquid, solid or in solution. The liquid epoxy resins predominantly contain epoxy groups, while the solid epoxy resins contain epoxy end groups and free hydroxy groups inside the chain. The known technology for the cross-linking of epoxy resins with conventional cross-linking agents is fully utilizable in the present invention. Thus, depending on the structure, curing can be carried out by means of the cross-linking agents commonly utilized for the epoxy resins, for example anhydrides, amines, polyamines, polyaminoamides (obtained from polyamines and dimers of fatty acids), polyphenols, polythiols, polycarboxylic acids, dipolyisocyanates, according to techniques which are well known to those skilled in the art.

The utilizable polyamines may be primary or secondary, aliphatic or aromatic; examples thereof are meta-phenylenediamine, diethylenetriamine and xylyldiamine. Diamine is used in such amount as to have one aminohydrogen for each epoxide equivalent, variations of ±10% being allowable.

Utilizable too are anhydrides, such as for example phthalic, hexahydrophthalic, methyltetrahydrophthalic, trimellitic, pyromellitic, 2-dodecyl succinic, methyl-endomethylene tetrahydrophthalic(methylanidic)anhydrides.

With a view to reducing the reaction times and temperatures, accelerators such as N-butylimidazole, tris(-dimethylaminomethyl)phenol, benzyldimethylamine, triethanolamine are added in amounts of 0.5–1% by weight calculated on the resin.

Furthermore it is possible to use di-, tri- and tetra-isocyanates such as, for example, hexamethylenediisocyanate (HDI), isophoronediisocyanate (IPDI), toluene diisocyanate (TDI), methylene-bis-(4-cyclohexyl isocyanate) (H$_{12}$MDI) and trimers of TD1 and HD1.

The reaction forming the urethanic bond can be either or not accelerated by the catalysts which are generally utilized in the technology of the urethanes obtained from polyols and polyisocyanates. Anyway the addition of an efficient catalytic system permits one to operate at a low temperature (20°–60° C.) and in short times. Furthermore, by properly dosing the catalyst it is possible to optimize the pot life, namely the time during which the reaction mixture remains sufficiently fluid.

As catalysts it is possible to use tin derivatives, such as dibutyltin dilaurate, dibutyltin diacetate, dibutyltin oxide, iron derivatives such as iron acetylacetonate, titanium alcoholates such as titanium tetraisopropylate, tertiary amines such as triethylamine, in amounts ranging from 0.001 to 2% by weight, preferably from 0.1 to 0.5% by weight, referred to the total weight.

The above-specified cross-linking agents can be combined with cross-linking agents of the type described in European patent application No. 87-107,024, which agents, besides maintaining a high fluorine content, permit one also to obtain a higher impact strength.

For example, an amount up to 20% by weight on the total weight of the cross-linked resin permits one to combine a high impact strength with the previously described properties.

The cross-linking reaction can be conducted, for example, at room temperature (with a non aromatic amine), up to temperatures higher than 200° C. (with an anhydride); it is possible to add ingredients such as pigments or fillers of different nature, depending on the requirements of the fields of use, which are capable of reducing the costs of the manufactured article, of increasing the consistency thereof, of favouring the equalization of the pigment inside the resin, or of helping in reinforcing the structure of the resin from a mechanical viewpoint.

The pigments and other fillers, either or not of pigmentary nature, can be added to coat and/or protect the surface onto which the resin is applied, for example by reflecting the destructive sun's rays which otherwise could pass through the resin and cause a worsening of the underlying material.

The resin prepared starting from the polymers of the invention are consistent, due to their high fluorine content, with fillers of particular nature, such as polytetrafluoroethylene (PTFE) and fluoroethylene/propylene copolymers (FEP), which can be added to improve some mechanical characteristics such as impact strength and resistance to abrasion.

The chemico-physical and mechanical characteristics of the new class of fluorinated resins, constituting the object of the present invention, render these materials suitable for a plurality of applications.

The most significant characteristics of such resins are:
high fluorine content,
high chemical and hydrolytic resistances and resistance to atmospheric agents,
high thermal resistance,
low refraction index,
remarkable dimensional stability,
low wettability,
self-lubricating properties,
excellent mechanical properties,
water-repellency, oil-repellency,
high Tg,
low dielectric constant,
high heat dissipation coefficient.

In view of such exceptional characteristics, some of the fields of use of the products of the invention are those of adhesive, structural materials and composite materials with high performances or, for example, in the field of electronics, as supporting resins for printed circuits, encapsulating elements for chips, connecting resins for electric cables.

Furthermore, a very broad field of use is that of coatings and paints in general, and in particular for printed circuits, magnetic tapes and discs, optical readout discs, optical fibres and optical systems in general, paints for aeronautical and aerospace uses, barrier paints for sea environments, hydrophobic coatings for submarine systems, coatings of mechanical parts immersed in solvents and in general coatings of metal articles subjected to corrosion.

The advantages deriving from the use of the resins of the invention are generally due to the specific characteristics of said resins not present in the products of the prior art.

Moreover, as a function of the uses, mainly in the fields of coatings and paints, the polymers of the invention can be obtained with a very wide viscosity range; by consequence, in case of subsequent cross-linkings in situ, they can be applied as such onto the substrate, if they already exhibit an optimum viscosity, or they can be dissolved or diluted in a suitable solvent until the desired viscosity is obtained, whereafter they are applied onto the substrate to be coated and then are cross-linked.

Thus, an utmost interesting utilization is that effected by mixing two solutions having the desired viscosity, even extremely low viscosity, and containing respectively, in a proper solvent, the former the epoxy prepolymer and the latter the curing agent.

By immersion of the substrate to be coated into the mixture so obtained and after evaporation of the solvent and proper end thermal treatment, self-lubricating protective coatings also having an extremely low thickness are obtainable.

A further advantage of the polymers of the present invention resides in the fact that when said polymers are subjected to a treatment with amines or anhydrides, they exhibit free hydroxy groups along the chain, which are susceptible of a further subsequent cross-linking with polyisocyanates, or are useful to introduce different functional groups into the polymer.

The following examples are given merely to illustrate the present invention and are not to be considered as a limitation thereof.

The characterization of the obtained polymeric product has been carried out by tests according to the following standards.

| Mechanical properties | |
|---|---|
| Tensile stress | ASTM D457 |
| Elongation at break | ASTM D457 |
| Electrical properties | |
| Volume resistivity | ASTM D257 |
| Dielectric rigidity | ASTM D149 |
| Dielectric constant | ASTM D150 |
| Dissipation factor | ASTM D150 |
| Other properties | |
| Water absorption | ASTM D570 |

EXAMPLE 1

In a 4-neck flask of 1-liter volume there were mixed, in 300 cc of acetone, 116 g of fluorinated telomer HOCH$_2$CH$_2$(CF$_2$)$_4$CH$_2$CH$_2$OH (0.4 moles); 134.4 g of bisphenol AF 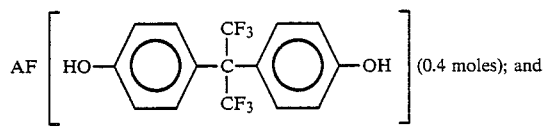 (0.4 moles); and 111 g of epichlorohydrin

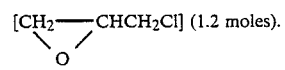 (1.2 moles).

Separately, an aqueous solution of NaOH was prepared by dissolving 72.8 g of the base in 72.8 cc of distilled H$_2$O. The basic solution was allowed to drop, under stirring, into the mixture at 35° C., whereafter the whole was heated under reflux for 8 hours. At the end of this period, it was filtered to separate the precipitated sodium chloride, then a 1N HCl solution was added until neutrality was obtained. The solvent was evaporated under vacuum at 50° C. and the resin was dissolved in CH$_2$Cl$_2$ with separation of the aqueous phase. It was anhydrified with anhydrous Na$_2$SO$_4$ and, after filtering, the solvent was evaporated at 50° C. under vacuum. Obtained were 290 g (yield=80%) of a fluid, transparent fluorinated prepolymer, having epoxy equivalent weight equal to 700, viscosity of 135 P at 70° C. and fluorine content of 29.5%.

EXAMPLE 2

In a 4-neck flask of 1-liter volume there were mixed, in 500 cc of acetone, 156 g of fluorinated telomer

[HOCH$_2$CH$_2$(CF$_2$)$_6$CH$_2$CH$_2$OH] (0.4 moles); 134.4 g of bisphenol AF (0.4 moles); 111 g of epichlorohydrin (1.2 moles). Separately, an aqueous solution of NaOH was prepared by dissolving 78 g of base in 78 cc of distilled water. Under stirring, the basic solution was dropped into the mixture at 35° C. and then it was treated as described in Example 1. Obtained were 328 g (yield=82%) of a fluid, tranparent fluorinated prepolymer having epoxy equivalent weight equal to 900 and fluorine content of 34%.

EXAMPLE 3

There were mixed 19.5 g of fluorinated telomer HOCH$_2$CH$_2$(CF$_2$)$_6$CH$_2$CH$_2$OH (0.05 moles) with 72.5 g of fluorinated telomer HOCH$_2$CH$_2$(CF$_2$)$_4$CH$_2$CH$_2$OH (0.25 moles). In a 4-neck (1) liter flask, 100.8 g of bisphenol AF (0.3 moles) and 83.3 g of epichlorohydrin (0.9 moles) were added to the mixture obtained. Separately, an aqueous solution of NaOH was prepared by dissolving 60 g of base in 60 cc of distilled water.

It was then continued as described in Example 1. Obtained were 235 g of a transparent fluorinated prepolymer (yield=85%) having an epoxy equivalent weight equal to 740 and a fluorine content of 30.4%.

EXAMPLE 4

The epoxy fluorinated polymer was prepared according to Example 3 starting from a mixture of 58.5 g of fluorinated telomer HOCH$_2$CH$_2$(CF$_2$)$_6$CH$_2$CH$_2$OH (0.15 moles) and 43.5 g of fluorinated telomer HOCH$_2$CH$_2$(CF$_2$)$_4$CH$_2$CH$_2$OH (0.15 moles) and adding the same amounts of bisphenol AF and epichlorohydrin as are specified in example 3. Obtained were 230 g of a transparent fluorinated prepolymer having an epoxy equivalent weight equal to 800 and a fluorine content of 31.8%.

EXAMPLE 5

The fluorinated epoxy polymer was prepared in like manner as is described in Example 3 starting from a mixture of 37.5 g of fluorinated telomer HOCH$_2$CH$_2$(CF$_2$)$_6$CH$_2$CH$_2$OH (0.25 moles) and of 14.5 g of fluorinated telomer HOCH$_2$CH$_2$(CF$_2$)$_4$CH$_2$CH$_2$OH (0.05 moles) and adding the same amounts of bisphenol AF and epichlorohydrin as are indicated in Example 3. Obtained were 252 g of a transparent fluorinated prepolymer having an epoxy equivalent weight equal to 860 and a fluorine content of 33.1%.

EXAMPLE 6

Into a 2-neck 500 cc flask there were mixed, in 50 cc of acetone, 25 g of fluorinated telomer

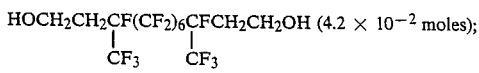
HOCH$_2$CH$_2$CF(CF$_2$)$_6$CFCH$_2$CH$_2$OH (4.2 × 10$^{-2}$ moles);
      |        |
     CF$_3$    CF$_3$ 9.6 g of bisphenol A (4.2×10$^{-2}$ moles); 78.5 g of epichlorohydrin (0.85 moles). Separately, an aqueous solution of NaOH was prepred by dissolving 7.5 g (0.187 moles) of base in 7.5 cc of distilled water. The basic solution was allowed to drop into the mixture at 35° C. under stirring, whereafter it was continued as described in Example 1. Obtained were 64.5 g of a fluid fluorinated prepolymer (yield=80%), having the color of amber, an epoxy equivalent weight equal to 497 and a fluorine content of 38% by weight.

EXAMPLE 7

Following the procedures described in Example 1, an epoxy resin was prepared by mixing 60 g of fluorinated telomer HOCH$_2$CH$_2$(CF$_2$)$_4$CH$_2$CH$_2$OH (0.2 moles), 57.4 g of epichlorohydrin (0.6 moles) and by adding 18 g of NaOH dissolved in 18 cc of distilled water. The resin obtained was fluid, amber-yellow, transparent and had an epoxy equivalent weight equal to 306. Thereafter, 10.52 g of this resin (0.034 epoxy equivalents) were mixed, in a 100 cc flask, with 2.88 g of bisphenol AF (0.0085 moles) and 0.1 g of diazadicyclooctane and the whole was reacted at 120° C. for 10 hours. Obtained was a yellow, transparent fluorinated resin having an epoxy equivalent weight equal to 1000 and a fluorine content of 32%.

EXAMPLE 8

Cross-linking of the resin (prepolymer) as per example 1 with pyromellitic anhydride. In a 100 cc flask, 12.0 g of the prepolymer prepared as is described in Example 1 were mixed with 5.4 g of pyromellitic anhydride dissolved in acetone, 0.1 g of 1-butylimidazole were added and acetone was evaporated under vacuum at 50° C.

The whole was poured into a mold and allowed to stand for two hours at 100° C. and for four hours at 210° C. A resin was obtained, which exhibited the following properties:

| | |
|---|---|
| Tg (°C.) | 150 |
| Water absorption (% by weight) | 0.10 |
| Contact angle (H$_2$O) | 100° |
| Volume resistivity (Ω.cm) | >10$^{15}$ |
| Dielectric rigidity (V · cm$^{-1}$) | 260 · 10$^3$ |
| Dielectric constant (22° C.) | 3.5 |
| Dielectric constant (100° C.) | 3.6 |
| Dissipation factor (tg δ) | 4 · 10$^{-3}$. |

EXAMPLE 9

Cross-linking of the resin as per Example 2 with methylnadic anhydride.

In a 100 cc flask, 14 g of the polymer prepared as is described in Example 2 were mixed with 12.6 g of methylnadic anhydride while deaerating under vacuum. 0.14 g of 1-butyl imidazole were then added and the whole was heated in a press to 100° C. for 1 hour and then to 165° C. for 5 hours.

A resin was obtained which exhibited the following properties:

| | |
|---|---|
| Tg (°C). | 120 |
| H$_2$O absorption (% by weight) | 0.10 |
| Volume resistivity (Ωcm) | >10$^{15}$ |
| Dielectric rigidity (V · cm$^{-1}$) | 280 · 10$^3$ |
| Dielectric constant (22° C.) | 3.3 |
| Dissipation factor (tg δ) | 3 · 10$^{-3}$ |
| Contact angle (H$_2$O) | 90° |

EXAMPLE 10

Cross-linking of the resin as per Example 3 with 2-dodecyl succinic anhydride.

In a 100 cc flask, 6.0 g of the polymer prepared as is described in Example 3 were mixed with 5.4 g of 2-dodecyl succinic anhydride and 0.06 g of 1-butyl imidazole. The whole was heated in a mold, under deaeration, at 100° C. for two hours, then at 204° C. for two hours. A resin was obtained which exhibited the following properties:

| | |
|---|---|
| Tg (°C.) | 105 |
| Tensile stress (kg/cm²) at 23° C. | 645 |
| Elongation at break (%) | 10 |
| Hardness (Shore D/3") | 76 |
| H₂O absorption (% by weight) | 0.11 |
| Contact angle (H₂O) | 95° |
| Volume resistivity (Ω.cm) | >10¹⁵ |
| Dielectric rigidity (V · cm⁻¹) | 310 · 10³ |
| Dielectric constant (22° C.) | 3.2 |
| Dissipation factor (Tg δ) | 2.8 · 10⁻³. |

EXAMPLE 11

Cross-linking of the resin as per Example 4 with hexahydrophthalic anhydride.

In a 100 cc flask, 15 g of the polymer prepared as is described in Example 4 were mixed with 13.5 g of hexahydrophthalic anhydride and 0.15 g of 1-butyl-imidazole. It was heated in a mold, under deaeration, at 100° C. for 1 hour and then at 150° C. for 2 hours, obtaining a resin having a Tg equal to 120° C.

EXAMPLE 12

Cross-linking of the resin as per Example 5 with phthalic anhydride.

In a 100 cc flask, 12.5 g of the polymer prepared as is described in Example 5 where mixed with 11.2 g of phthalic anhydride and 0.12 g of 1-butyl-imidazole. It was heated in a mold, under deaeration at 100° C. for 1 hour and then at 150° C. for 3 hours, obtaining a resin having Tg equal to 115° C.

EXAMPLE 13

Cross-linking of the resin as per Example 6 with methylnadic anhydride.

In a 100 cc flask, 20 g of the polymer prepared as is described in example 6 were mixed with 18 g of methylnadic anhydride and 0.2 g of 1-butyl imidazole.

The whole was allowed to stand in the mold at 100° C. for 1 hour and at 204° C. for 5 hours while deaerating. A resin exhibiting a Tg equal to 90° C. was obtained.

EXAMPLE 14

Cross-linking of the resin as per Example 7 with pyromellitic anhydride.

In a 100 cc flask, 16.8 g of the polymer prepared as is described in Example 7 were mixed with 7.6 g of pyromellitic anhydride dissolved in acetone. 0.17 g of 1-butyl imidazole were added while evaporating the solvent at 50° C. under vacuum, whereafter the whole was allowed to stand in a mold at 100° C. for two hours and at 120° C. for three hours. A resin having a Tg equal to 80° C. was obtained.

What we claim is:

1. Fluorinated epoxy resins, containing at least 10% by weight of fluorine and characterized by the structural units represented by the following formula:

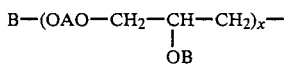

-continued
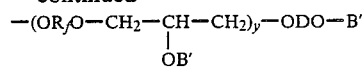

wherein:
x = an integer from 0 to 20,
y = an integer from 1 to 20,
B, B', equal to or different from each other, are H or

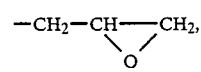

A = a radical of a fluorinated or non-fluorinated diol, containing one or more aromatic or cycloaliphatic or polycyclic rings,
$R_f$ = a perfluoroalkylene radical of formula:

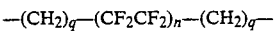

wherein
n is an integer from 2 to 8 and
q = 1 or 2, or of formula:

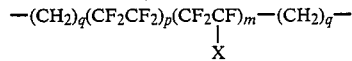

wherein p and m are integers from 1 to 8, 9 = 1 or 2, and X is a perfluoroalkyl group having from 1 to 3 carbon atoms or a halogen other than F,
D = A or $R_f$.

2. The polymers according to claim 1, wherein A is derived from a diol selected from the group consisting of:

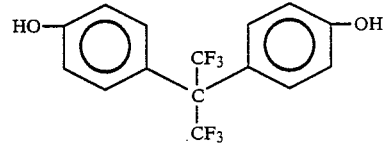

(hexafluoro-isopropylidene-p,p'-diphenol, referred to as bisphenol AF),

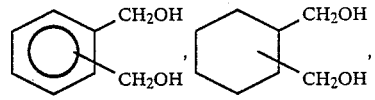

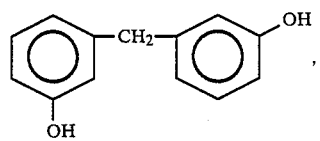

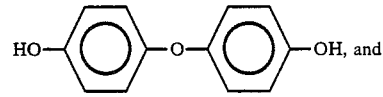

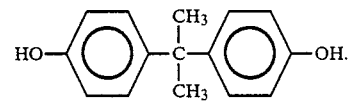

* * * * *